United States Patent [19]

Adachi et al.

[11] Patent Number: 5,169,535
[45] Date of Patent: Dec. 8, 1992

[54] METHOD OF REMOVING ENDOTOXIN

[75] Inventors: Tsuneyasu Adachi; Junichi Ida; Masanori Hashimoto, all of Tokyo, Japan

[73] Assignee: Kurita Water Industries Ltd., Tokyo, Japan

[21] Appl. No.: 583,657

[22] Filed: Sep. 17, 1990

[30] Foreign Application Priority Data

Sep. 22, 1989 [JP] Japan .................. 1-247013
Sep. 22, 1989 [JP] Japan .................. 1-247014

[51] Int. Cl.$^5$ ............................... B01D 15/00
[52] U.S. Cl. .......................... 210/669; 210/691
[58] Field of Search .................. 210/669, 691

[56] References Cited

U.S. PATENT DOCUMENTS 4,381,239 4/1983 Chibata et al. ................. 210/692
4,814,077 3/1989 Furuyoshi et al. ............... 210/266
4,975,542 12/1990 Hirayama et al. ................ 536/20
4,992,180 2/1991 Onodera et al. ................. 210/688

FOREIGN PATENT DOCUMENTS 59-30722 7/1984 Japan .
63-56300 3/1988 Japan .
63-54285 10/1988 Japan .
63-287503 11/1988 Japan .
1-16389 3/1989 Japan .

Primary Examiner—Ivars Cintins
Attorney, Agent, or Firm—Kanesaka and Takeuchi

[57] ABSTRACT

A method of removing endotoxin from a solution containing only endotoxin as a absorbed material, wherein the pH value of the solution is adjusted to pH 9 or lower than it, and subsequently, the solution is passed through a column packed with a crosslinked granular chitosan.

10 Claims, 1 Drawing Sheet

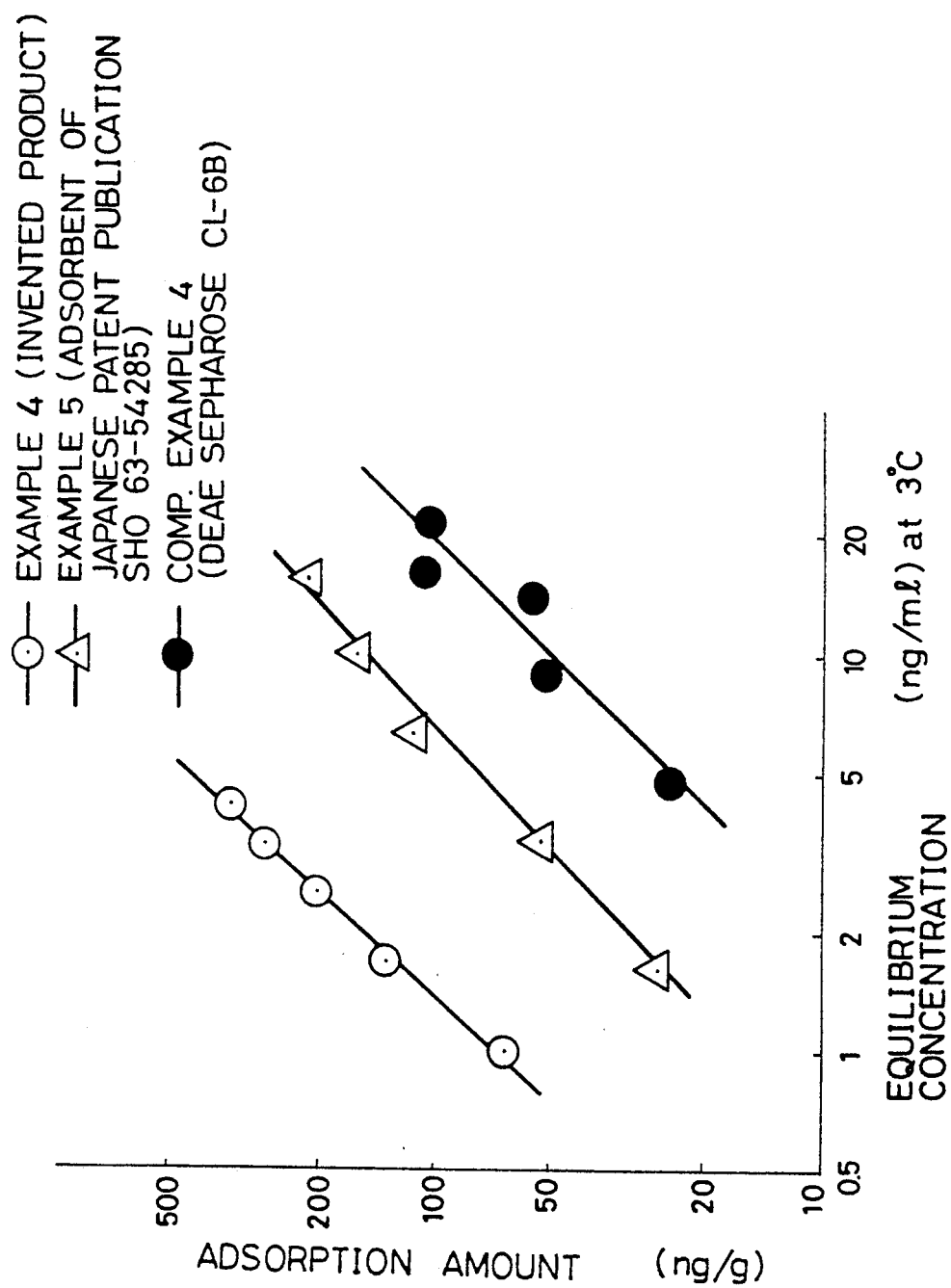

METHOD OF REMOVING ENDOTOXIN

FIELD OF THE INVENTION AND RELATED ART STATEMENT

The present invention concerns an endotoxin adsorbent and a method of removing endotoxin and, more in particular, it relates to an endotoxin adsorbent having a remarkably high endotoxin adsorption efficiency capable of removing an endotoxin to an extremely low concentration of pg/ml order and capable of treating a great amount of material with a small amount of adsorbent, as well as a method of separating to remove selectively and efficiently endotoxin in a solution containing only endotoxin or protein and endotoxin as absorbed materials.

In the purification of medicines such as proteins produced by biotechnology, endotoxin as an impurity has to be removed to the order of several - several tens picograms per milliliter. Heretofore, as a technique for removing endotoxin, a method of using a low molecular weight chitosan has been proposed (refer, for example, to Japanese Patent Laid-Open Sho 63-56300). That is, when a solution to be treated is passed through a column, in which a low molecular weight chitosan adsorbed on a carrier is packed a specific adsorption is taken place between the low molecular weight chitosan and endotoxin, and the endotoxin in the solution can be removed. Further, Japanese Patent Laid-Open Sho 63-287503 discloses adsorptive and separation of endotoxin by bringing an aqueous solution of endotoxin into contact with chitosan immobilized on a finely porous polyamide membrane crosslinked with chitosan. Further, as a method of removing endotoxin to a low concentration, studies have been made also on ion chromatography, gel chromatography or affinity chromatography (refer, for example, to Japanese Patent Publication Hei 1-16389).

The method using the low molecular weight chitosan as disclosed in Japanese Patent Laid-Open Sho 63-56300 has no sufficient endotoxin adsorption effect and, although the method is effective for removing endotoxin at a concentration of mg/ml order to a concentration on the order of several tens ng/ml, it is difficult to remove to an extremely low concentration of pg/ml order. That is, since chitosan immobilized on the carrier as disclosed in Japanese Patent Laid-Open Sho 63-56300 has a low molecular weight and the content of chitosan on the carrier used for the adsorption of endotoxin is small, the equilibrium adsorption amount of endotoxin is small. Accordingly, this method is practically not suitable for the purpose of removing endotoxin in a protein solution to the order of pg/ml. By the way, in the example of Japanese Patent Laid-Open Sho 63-56300, the endotoxins were only removed to several hundreds ng/ml - several tens ng/ml, specifically from 270 to 57 ng/ml.

Since the chitosan immobilized on the membrane disclosed in Japanese Patent Laid-Open Sho 63-287503 is as low as less than 10%, it is considered that the equilibrium adsorption amount of endotoxin is also small and it is impossible to remove endotoxin to an extremely low concentration. Japanese Patent Laid-Open Sho 63-287503 shows an example for removing endotoxin in water, but it is not practically suitable for the removal of endotoxin in a protein solution since the equilibrium adsorption amount of endotoxin on the membrane is small as described above.

Ion chromatography, gel chromatography or affinity chromatography has been studied to remove endotoxin to the order of pg/ml, but each of them has drawbacks and can not be said practically useful. That is, since the molecular distribution of endotoxin is very wide it is difficult by the gel chromatography to separate endotoxin from high molecular weight substance such as proteins. Further, in the ion chromatography or affinity chromatography, the equilibrium adsorption amount is small and, in addition, it is difficult to determine conditions such as pH, ion strength and regeneration conditions.

In the prior art, since no definite conditions have been set for the technique of removing endotoxin in a protein solution, in particular, for the purpose of purifying the proteins, it has been impossible to remove endotoxin in the protein solution selectively and efficiently.

OBJECT AND SUMMARY OF THE INVENTION

It is, accordingly, an object of the present invention to overcome the foregoing problems in the prior art and provide a endotoxin adsorbent capable of effectively removing endotoxin to an extremely low concentration of pg/ml order, for example less than 100 pg/ml.

Another object of the present invention is to provide a method of removing endotoxin capable o selectively and efficiently removing endotoxin in a solution which contains only endotoxin or both endotoxin and protein as absorbed materials to an extremely low concentration.

The endotoxin adsorbent in accordance with the present invention is prepared by dispersing an aqueous acidic solution of chitosan into a hydrophobic dispersing medium, evaporating water under stirring to obtain a granular porous chitosan and crosslinking the resultant granular chitosan.

That is, the present inventors have made a study on a method of removing endotoxin with a powdery chitosan or a porous granular chitosan obtained by a known alkali precipitation method, and have found that it is impossible to remove endotoxin to the order of pg/ml. Then, as a result of a further study, it was found that a gel synthesized by removing water from a chitosan solution in a hydrophobic dispersing medium can remarkably remove endotoxin to the order of pg/ml.

The feature of the method removing endotoxin in accordance with the present invention resides in a method of removing endotoxin from a solution containing only endotoxin as an absorbed material, wherein the pH value of the solution is adjusted to pH 9 or lower than it, and subsequently, the solution is passed through a column packed with a crosslinked porous granular chitosan.

The feature of another method of removing endotoxin in accordance with the present invention resides in a method of removing endotoxin from a solution containing protein and endotoxin as absorbed materials, wherein the pH value of the solution is adjusted to equal or less than the isoelectric point of the protein and, subsequently, the solution is passed through a column packed with a crosslinked granular chitosan.

Specifically, the present inventors have made a study on the method of removing endotoxin in a solution and, as a result, have found that a crosslinked porous granular chitosan has a great chitosan content as an adsorbent and shows capability of a great endotoxin equilibrium adsorption amount and, accordingly, it is extremely effective. Then, as a result of a further study on selectively and effectively removing only endotoxin from a solution contains both of endotoxin and protein using the crosslinked porous granular chitosan, it was found that endotoxin can be removed selectively and efficiently by adjusting the pH value of the solution to equal or less than the isoelectric point of the protein, that was not suggested at all in the prior art.

BRIEF DESCRIPTION OF THE DRAWINGS

FIG. 1 is a graph showing results of Examples 4 and 5, and Comparative Example 4.

DESCRIPTION OF THE PREFERRED EMBODIMENTS

The present invention will now be described more in details.

At first, description will be made to a method of preparing an endotoxin adsorbent in accordance with the present invention.

Upon preparing an endotoxin adsorbent according to the present invention, an aqueous acidic solution of chitosan is dispersed in a hydrophobic dispersing medium and water is evaporated under stirring to thereby obtain a porous granular chitosan.

Chitosan is prepared by acetylating chitin contained in exoskeletons of Crustacea such as crabs and prawns, together with a concentrated alkali. Thus prepared chitosan usually has a molecular weight of 5,000 to 1,000,000, an intrinsic viscosity (at 30° C., in 0.2 M acetic acid +0.1 M sodium acetate) $[\eta]=0.25$ to 30 dl/g-chitosan, a colloid equivalent of from 3.0 to 6.2 meq/g-chitosan. There is no particular restriction for the degree of deacetylation so long as chitosan is deacetylated to such an extent as capable of dissolving by using an acid and, generally, an acetylation degree of about 50 to 100 mol% is preferred. Further, the average grain size of chitosan is preferably from about 9 to 300 mesh.

Any of acids may be used for forming an aqueous acidic solution of the thus obtained chitosan so long as it can dissolve chitosan. Typical examples of the acid are organic acid such as acetic acid, formic acid, propionic acid, butyric acid, valeric acid, isopropionic acid, isobutyric acid, isovaleric acid, benzoic acid, succinic acid, salicylic acid and phthalic acid, as well as, mineral acids such as hydrochloric acid and nitric acid.

It is preferred that the amount of the acid used is as less as possible and it is used in a least amount capable of dissolving the chitosan. Generally, acid is added by from 0.2 to 5 times (by weight) of the chitosan.

The concentration of the chitosan in the acidic aqueous solution of chitosan is appropriately determined depending on the molecular weight and the degree of deacetylation of chitosan and it is, usually, from 0.1 to 20% by weight and, preferably, from 0.5 to 5.0% by weight. The grain size of the resultant gel has a correlationship with the concentration of chitosan. For instance, the grain size can be reduced by lowering the concentration of chitosan and the grain size can thus be controlled.

If the aqueous acidic solution of chitosan contains insoluble matters, it is preferred to use the solution after filtering the insoluble matters by means of glass filters or metal fabric mesh such as made of stainless steel or copper.

Any of ingredients may be used for constituting the hydrophobic dispersing medium so long as it can disperse the aqueous acidic solution of chitosan and there is no particular restrictions. Preferably there can be mentioned a compound having a boiling point of 100° C. or higher or such an azeotropic compound that the dispersing medium ingredient itself can azeotropically boil together with water. As examples of the compound having a boiling point of higher than 100° C., there can be mentioned decahydronaphthalene (decalin), toluene, tetrahydronaphthalene (tetralin), xylene, ethylbenzene, diethylbenzene, anisole, hexanole, octanol, dibutylether, petroleum benzine and ligroin. Further, as an azeotropic compound capable of azeotropically boiling with water, any compound can be used with no particular restrictions so long as it can azeotropically boil with water and disperse the aqueous acidic solution of the chitosan, and there can be mentioned, for example, benzene, cyclohexane, toluene or chloroform.

When the aqueous acidic solution of chitosan is added to and dispersed into such a hydrophobic dispersant, it is preferred to add the aqueous acidic solution of the chitosan gradually little by little to the dispersant. The concentration of chitosan in the dispersion is one of factors that determines the grain size of the chitosan gel and the greater grain size can be obtained as the concentration of the chitosan is higher.

For the vessel to be used, those having such a wall surface that the chitosan gel does not adhere, for example, a vessel applied with a teflon coating is preferred.

When the aqueous acidic solution of chitosan is dispersed in the hydrophobic dispersant, an organic material capable of azeotropically boiling with water and/or a surface active agent may be added.

Among them, as the organic material capable of azeotropically boiling with water, there can be mentioned, for example, benzene, methanol, ethanol, acetone, cyclohexane, toluene, chloroform, 2-pentanone, and 3-pentanone. Addition of the organic material capable of azeotropically boiling with water can provide an effect of reducing the boiling point of water and promoting the evaporating rate.

On the other hand, although there is no particular restriction on a surface active agent, cationic or nonionic surface active agent can be used usually. For instance, there can be used polyoxyethylene alkylphenyl ethers, polyoxyethylene alkyl ethers, polyoxyethylene fatty acid partical esters, polyfunctional alcohol fatty acid partial esters and polyethylene polyamine fatty acid amide salts, etc. The surface active agent mentioned above serves to satisfactorily disperse the aqueous acidic solution of the chitosan into the dispersant and it is, particularly, suitable to the case of preparing a chitosan of a smaller grain size. The addition amount of the surface active agent is usually less than 50% by weight based on the chitosan solution.

The azeotropically boiling organic material or the surface active agent may be added to the acidic solution of the chitosan or added to the dispersant. For evaporating to remove water from the liquid dispersion obtained by dispersing the aqueous acidic solution of chitosan into the hydrophobic dispersant, the liquid dispersion is usually heated to 50°-100° C. under stirring. In a case where the dispersant capable of azeotropically boiling with water is used as the hydrophobic dispersant, or where an organic material capable of azeotropically boiling with water is added, the dispersant is heated to a temperature lower than the azeotorpic boiling point.

As the stirring conditions for the dispersant, it is preferred to conduct high speed stirring for preparing homogenous particles. For instance, a number of rotation of 300–5,000 r.p.m., particularly, 400 to 3,000 r.p.m. and a peripheral speed of 1 to 20 m/sec are preferred for stirring the dispersion of 1 liter volume. The stirring speed is one of factors that determines the grain size of the resultant chitosan and the greater grain size is obtained as the stirring speed is lowered.

The end point for the removal of water by evaporation can be determined as a point at which more than 80% by weight of water in the aqueous acidic solution of the chitosan is removed by evaporation.

As the means for the removal of water by evaporation, there can be used in addition to the simple heating method as described above, a reduced pressure method, gas blowing method (for example, blowing $N_2$ gas), refluxing method or other known method. In a preferred embodiment, water is separated by refluxing from an azeotropic compound and the dispersant or the organic material forming the azeotropic compound with water are returned to the dispering medium for reutilization.

The thus prepared porous granular chitosan can usually be recovered by filtering the medium concentrated by the removal of water by evaporation.

The recovered porous granular chitosan is washed with a solvent not dissolving the chitosan itself but dissolving the dispersant or the azeotropic compound, preferably, dissolving also water, for example, ethanol or acetone and, subsequently, applied with alkali washing.

That is, since the chitosan prepared in accordance with the method as described above is obtained in the form of an acid salt of chitosan, it is washed with an alkali to form chitosan having non-dissociation type amino groups. The alkali washing can be conducted by using an aqueous solution of NaOH, KOH or $NH_3$, or a mixed solution of such an aqueous solution and an organic solvent. After the alkali washing, residual alkali is removed by water washing.

The thus prepared porous granular chitosan is then subjected to a crosslinking reaction. Crosslinking can be conducted by treating the chitosan with addition of a crosslinking reagent such as epichlorohydrin, glutaraldehyde and organic diisocyanate, if necessary, in an appropriate solvent.

As the solvent used for the crosslinking reaction, there can be used alcohols such as methanol, ethanol or isopropanol, ketones such as acetone or methyl ethyl ketone, and amides such as dimethylformamide (DMF) or dimethylacetamide or dimethylsulfoxide. Such polar solvents may be used alone or as a mixture of two or more of them. As the organic diisocyanate, there can be mentioned, for example, 4,4'-diphenylmethane diisocyanate, 1,4-phenylene diisocyanate, 2,4-tolylene diisocyanate, naphthalene diisocyanate, 4,4'-dicyclohexylmethane diisocyanate, xylylene diisocyanate, isophorone diisocyanate and hexamethylene dissocyanate.

There is no particular restriction for the amount of the crosslinking reagent used but it is preferably about from 0.2 to 0.8 equivalent amount based on one equivalent amount of amino groups in chitosan. Further, in the case of using the solvent, the amount of the solvent is preferably from 1 to 5 times by volume of the porous granular chitosan.

The crosslinking conditions vary depending on the kind of the crosslinking reagent and the solvent employed and, usually, the crosslinking is conducted at a temperature of $-10°$ C. to $60°$ C. for a time of from 0.05 to 5 hours.

The endotoxin adsorbent according to the present invention is prepared by the method as described above. When using the adsorbent, it is at first brought into contact with an alkali solution to deactivate and remove the endotoxin adsorbed thereon. As an alkali solution, an aqueous solution of NaOH, KOH, $NH_3$ or the like, or a mixed solution of such an aqueous solution and an organic solvent at a concentration of from 0.01 to 1N can be used. Subsequently, the adsorbent was washed with water by using water not containing endotoxin (endotoxin-free water) to remove excess alkali by washing. After washing, the adsorbent can be used for the removal of the endotoxin. If necessary, the adsorbent may further be brought into contact with an aqueous solution of the acid used for the preparation of the aqueous acidic solution of the chitosan, or a mixed solution of such an aqueous solution with an organic solvent at an acidic concentration of 0.01N to 1N, so that the amino groups in the chitosan are formed into dissociating type. In a case if the adsorbent is brought into contact with acid, it is further washed with water not containing endotoxin to remove excess acid by washing.

The endotoxin adsorbent in accordance with the present invention obtained by the method as described above is a gel-like material usually having an ion exchange capacity of from 0.01 to 0.5 meq/ml and a specific surface area of from 1 to 250 $m^2/g$—dry weight chitosan.

The method of removing an endotoxin according to the present invention will now be described specifically.

This invention is also concerned with a method of removing endotoxin from a solution which contains only endotoxin or endotoxin as well as protein by adjusting the pH value of the solution to a specific pH range according to contents of the solution, and subsequently passing the solution through a column packed with a crosslinked granular chitosan.

At first, description will be made to a crosslinked granular chitosan used as the endotoxin adsorbent in the method according to the present invention.

In the method of the present invention, any kind of crosslinked porous granular chitosan can be applicable. Namely, even a known crosslinked granular chitosan can be used so long as an endotoxin adsorbent is composed of a crosslinked porous granular chitosan. However, the crosslinked porous granular chitosan which is obtainable by the present invention as mentioned above is most suitable by the reason as mentioned later. As a method of preparing an endotoxin adsorbent by known method, there can be mentioned, for example, a method of adding an acidic solution of chitosan to a hydrophobic solvent containing an emulsifier to cause emulsification and, subsequently, stirring them in an alkali solution to obtain a porous granular chitosan, followed by crosslinking reaction (Japanese Patent Publication Sho 59-30722). As another example using an adsorbent which is composed of a low molecular weight chitosan, there can be mentioned a method of dissolving a low molecular weight chitosan into an acidic solution, then dropping the solution into an alkaline solution to obtain granulation and then applying a crosslinking reaction (Japanese Patent Publication Sho 63-54285).

Description in detail will now be made to one example of the method of preparing crosslinked granular chitosan to be able to use for the present invention according to a known method.

Among chitosans obtained by deacetylating chitin contained in exoskeletons of Crustacea such as crabs of prawns by heating together with a concentrated alkali, low molecular weight chitosans having a molecular weight of 10,000 to 500,000 and deacetylation degree of 50 to 100 mol% are used in the preparation example. The low molecular weight chitosan is at first dissolved into the acidic solution as described above to prepare an aqueous acidic solution of the chitosan.

The amount of the acid used is preferably as less as possible and it is used in a least amount capable of dissolving the chitosan. Generally, acid from 0.2 to 5 times (by weight) of the chitosan is added.

The concentration of the chitosan in the aqueous acidic solution of the chitosan is determined appropriately depending on the molecular weight and the deacetylation degree of the chitosan and it is usually from 2 to 20% by weight.

The resultant aqueous acidic solution of the chitosan is dropped to obtain a porous granular chitosan into an alkaline solution under stirring. For the alkaline material in the alkaline solution used herein, there can be mentioned alkaline material such as sodiumhydroxide, potassium hydroxide, sodium carbonate, potassium carbonate, ammonia and ethylene diamine. As a solvent, water or polar alcohol such as methanol or ethanol, or a mixed solvent such polar solvent and water may be mentioned. Although there is no particular restriction on the concentration of the alkaline solution, usually a solution at a concentration of 1 to 20% by weight is used.

The granular chitosan obtained by precipitating in an alkali solution has usually a grain size of about 1 μm to 1 mm, which is served for crosslinking after removal of water subsequent to the water washing.

The crosslinking reaction can be applied by adding a crosslinking reagent such as epichlorohydrin, glutaraldehyde or organic diisocyanate in the same manner as in the cross-linking reaction in the preparation of the endotoxin adsorbent according to the present invention as described above, if necessary, in an appropriate solvent.

The thus prepared crosslinked granular chitosan is at first put to alkali washing by contacting with the alkaline solution to deactivate and remove adsorbed endotoxin before use, which was then washed with water not containing endotoxin (endotoxin free water) to wash out excess alkali. After the water washing, it can be used for the removal of endotoxin. If necessary, it may be used after contacting with the aqueous solution of the acid or a mixed solution thereof with an organic solvent at a acidic concentration of from 0.01 to 1N so that the amino groups in the chitosan are formed into the dissociating type. After contact with acid water washing is further applied subsequently with water not containing endotoxin to wash out excess acid.

Description will no be made to the method of removing endotoxin by using the endotoxin adsorbent which is ex plained above.

When a solution contains only endotoxin as an absorbed material, pH of the solution is adjusted to pH 9 or lower, and subsequently the solution is passed through a column packed with a crosslinked porous granular chitosan through which the solution to be treated is passed and the effluent of the column is recovered. In this case, the liquid flow rate as space velocity (sv) is usually from 0.1 to 5 BV·hr$^{-1}$, preferably, from 0.5 to 3 BV·hr$^{-1}$, although depending on the degree of removal for endotoxin.

Any acid or base is applicable to adjust pH of the solution. Any kind of crosslinked porous granular chitosan is applicable in the present method invention as mentioned above, but the endotoxin adsorbent which is prepared by the method of the present invention is most suitable and preferable. The reason is described below.

Further description will then be made to a method of removing endotoxin from a solution containing endotoxin and protein as absorbed materials in accordance with the present invention by using the crosslinked porous granular chitosan as the endotoxin adsorbent.

In the method according to the present invention, such a crosslinked porous granular chitosan is packed into a column, and a solution containing protein and endotoxin to be treated is adjusted to pH equal to or lower than the isoelectric point of the protein and passed through the column and the effluent of the column is recovered. If the pH of the solution is in the alkaline range as compared with the isoelectric point of the protein contained, protein is also adsorbed to the crosslinked granular chitosan to lower the protein recovery rate. The pH value of the solution is, preferably, lower by 0.5 or more of the isoelectric point of the protein.

In the present invention, the pH value can easily be adjusted by varying the concentration of the acid and the base of a buffer. Further, it can be adjusted easily also by the addition of salt such as sodium chloride.

In the present invention of this case, the liquid flow rate has a great effect on the efficiency for the removal of endotoxin and suitable liquid flow rate as space velocity (SV) is, usually from 0.2 to 2 BV·hr$^{-1}$, particularly, from 0.5 to 1 BV hr$^{-1}$. If SV is greater than 2 BV·hr$^{-1}$ or lower than 0.2 BV·hr$^{-1}$, the endotoxin removal rate is remarkably lowered making it difficult to extremely reduce the endotoxin concentration in the effluent.

In any method according to the present invention, the crosslinked porous granular chitosan after being used for the removal of endotoxin can be regenerated and reused by applying alkali washing with the alkaline solution and water washing as described above.

There is no particular restrictions on the protein to be treated and the protein in the endotoxin-containing solution in the present invention and any protein may be treated so long as it is stable at the pH equal to or lower than the isoelectric point thereof.

According to the present invention, the endotoxin can be removed selectively and efficiently even from a solution of a relatively low concentration of endotoxin and the concentration of endotoxin in the effluent can be reduced extremely. Accordingly, the method of the present invention is extremely effective, in particular, for the solution of an endotoxin concentration of lower than 1,000 ng/ml.

The crosslinked porous granular chitosan which is used to the present invention contains chitosan as high as more than 30% (the balance is a crosslinking reagent) and, therefore, it has a great endotoxin equilibrium adsorption capacity. Accordingly, it is possible to effectively separate and remove the endotoxin by adsorption and reduce the concentration of the endotoxin to an extremely low level like less than 100 pg/ml. By the way, chitosan immobilized on the finely porous polyamide membrane disclosed in Japanese Patent Laid-Open Sho 63-287503 has a chitosan content of lower than 10%. Further, the low molecular weight chitosan immobilized on carrier disclosed in Japanese Patent Laid- Open Sho 63-56300 also has a low chitosan content. Accordingly, high endotoxin equilibrium adsorption capacity as in the present invention can not be obtained and, therefore, it is difficult to reduce the endotoxin concentration to an extremely low level.

Any kind of crosslinked porous granular chitosan is applicable in the method of the present invention as mentioned above, but the endotoxin adsorbent which is prepared by the method of the present invention is most suitable and preferrable. The reason is described below.

The adsorbing performance for the endotoxin greatly depends on the difference of the production steps, and it is assumed that the endotoxin adsorbent in accordance with the present invention has a remarkably greater pore size of about 2-20 times as compared with the granular chitosan obtained by the method as disclosed in Japanese Patent Publication Sho 63-54285 and, accordingly, it has a great amount of pores and can intake a great amount of endotoxin to its inside. Such a remarkably high endotoxin adsorbing efficiency brings a possibility to remove endotoxin at a concentration of from several tens to several hundreds ng/ml to an extremely low concentration like less than 100 pg/ml, which has been considered difficult so far. In addition, since the equilibrium adsorption capacity is greater than that in the conventional adsorbent, it is possible to treat a great amount of liquid with a small amount of the adsorbent.

In addition, in the present invention, since the protein is treated at a pH value of equal to or lower than the isoelectric point by using such a crosslinked porous granular chitosan, the protein is scarcely adsorbed to the crosslinked porous granular chitosan and it is possible to remove only the endotoxin selectively and efficiently.

As has been described above specifically by the method of removing endotoxin according to the present invention, it is possible to remove only endotoxin from the solution containing protein and endotoxin selectively, efficiently and easily, so that a processed effluent with an extremely low endotoxin concentration can be obtained.

Furthermore, since the crosslinked porous granular chitosan used as the adsorbent has excellent alkali resistance, it can be regenerated and reused by alkali washing, which is extremely economical.

The method of removing endotoxin according to the present invention is extremely useful for industrial application such as for purification of protein solutions used for medicines.

The present invention will now be described more specifically referring to examples and comparative examples but the present invention is not restricted only on the following examples unless it does not go beyond the gist of the present invention.

In the following examples and comparative examples, endotoxin was measured quantitatively by using a toxy color system manufactured by Seikagaku Kogyo Co., Ltd., while alubumin is measured quantitatively by measuring the optical absorption of UV-rays (280 nm).

EXAMPLE

Example 1

Preparation of Endotoxin Adsorbent 5 g of chitosan having an intrinsic viscosity of 23 (dl/g), a colloid equivalent of 5.0 (meq/g), a molecular weight of about one million, an average grain size of from 9 mesh to 200 mesh, an average grain size of from 16 to 24 mesh and a deacetylation degree of 85 mol% was dissolved in one liter of an aqueous 0.5 wt% acetic acid solution to prepare an aqueous 0.5 wt% acidic solution of the chitosan.

50 ml of the aqueous solution was dispersed into a dispersant comprising a mixed solution of 800 ml of dacalin and 200 ml of benzene incorporated with 10 ml of Nonipole 110 (manufactured by Sanyo Kasei Kogyo Co., Ltd.) under stirring at 2000 rpm by using a cross-like stirring blade.

Water in the aqueous acidic solution of the chitosan used was evaporated off by warming the liquid dispersion in a water bath at 80° C. while maintaining the dispersed state. When water was evaporated, a porous granular chitosan was obtained. It was separated by filtration, washed several times with ethanol, further washed several times with an aqueous 10w% ammonia solution and then washed with water to obtain 2 ml of porous granular chitosan (gel) of 0.1 mm grain size.

20 ml of the gel obtained by repeating the abovementioned method was added to 40 ml of a solution of DMF/acetone 2/1 (v/v), to which 0.20 g of hexamethylene diisocyanate was added while stirring at 20° C. Subsequently, it was further stirred at 20° C. for 90 min. As a result, an acid resistant and alkaline resistant chitosan gel with an ion exchange capacity of 0.24 meg/ml and a specific surface area of 7 $m^2$/ml was obtained.

Endotoxin Removing Test

The chitosan gel obtained by the method described above was packed into a column of 10 mm diameter and 100 mm length, and the inside of the column was washed with an aqueous 0.5N NaOH solution and alkali was washed out with endotoxin free water. Further, the inside of the column was replaced with an aqueous 1 wt% of acetic acid solution and then excess acid was washed out with endotoxin free water. Subsequently, the inside was replaced with an acetate buffer of the same composition as that of the test solution and used for the test.

The test was conducted by using a testing solution prepared by dissolving endotoxin (E. coli, 0127: B8 manufactured by DIFCO LABO.) into an acetate buffer to a concentration as shown in Table 1 and passing the solution to the column under the conditions as shown in Table 1. The ionic strength was adjusted by controlling the concentration of the acetate buffer.

The endotoxin concentration in the effluent is shown in Table 1.

Comparative Example 1

A test was conducted under the conditions shown in Table 1 by using a test solution prepared by dissolving the endotoxin into an acetate buffer to a concentration as shown in Table 1 under the same procedures as in Example 1 except for using a chitosan gel prepared by the method in Example 1 of Japanese Patent Publication Sho 63-54285 and crosslinked with hexamethylene diisocyanate. The endotoxin concentration in the effluent is shown Table 1.

TABLE 1

| Example | No. | Adsorbent | Endotoxin conc. in fed solution (ng/ml) | Endotoxin conc. in effluent (ng/ml) | Condition | | | |
|---|---|---|---|---|---|---|---|---|
| | | | | | pH (—) | Ionic strength (—) | Flow rate (BV·hr$^{-1}$) | Feed volume (ml) |
| Example 1 | 1 | Product of the invention | 140 | <0.01 | 4.2 | 0.02 | 1 | 35 |
| | 2 | | 46 | <0.01 | 4.2 | 0.05 | 1 | 40 |
| | 3 | | 200 | <0.01 | 4.2 | 0.1 | 1 | 35 |
| | 4 | | 46 | <0.01 | 4.2 | 0.05 | 0.5 | 65 |
| | 5 | | 42 | <0.01 | 4.2 | 0.05 | 0.25 | 110 |
| Comp. Example 1 | 5 | Adsorbent of Japanese Patent Application 63-54285 | 35 | 0.9 | 4.0 | 0.01 | 0.5 | 20 |
| | 6 | | 58 | 2.9 | 4.2 | 0.01 | 0.1 | 50 |

Example 2

Preparation of Endotoxin Adsorbent 5 g of chitosan having an intrinsic viscosity of 13.5 (dl/g), a colloid equivalent of 4.9 (meq/g), a molecular weight of about 180,000 an average grain size of from 9 mesh to 200 mesh, an average grain size of from 16 to 24 mesh and a deacetylation degree of 82 mol% was dissolved in one liter of an aqueous 0.5 wt% acetic acid solution to prepare an aqueous 0.5 wt% acidic solution of chitosan.

50 ml of the aqueous solution was dispersed into a dispersant comprising a mixed solution of 800 ml of dacalin and 200 ml of benzene incorporated with 10 ml of Nonipol 110 (manufactured by Sanyo Kasei Kogyo Co.) under stirring at 2000 rpm by using a cross-like stirring blade.

Water in the aqueous acidic solution of the chitosan used was evaporated off by warming the liquid dispersion in a water bath at 80° C. while maintaining the dispersed state. When water was removed, a porous granular chitosan was obtained. It was separated by filtration, washed several times with ethanol, further washed several times with an aqueous 0.11N NaOH solution and then washed with water to obtain 2 ml of porous granular chitosan (gel) of 0.1 mm grain size.

20 ml of the gel obtained by repeating the abovementioned method was added to 40 ml of a solution of DMF/acetone 2/1 (v/v), to which 0.20 g of hexamethylene diisocyanate was added while stirring at 20° C. Subsequently, it was further stirred at 20° C. for 90 min. As a result, an acid resistant and alkaline resistant chitosan gel with an ion exchange capacity of 0.09 meg/ml and a specific surface area of 10 m$^2$/ml was obtained.

Example 3

1 A test for removing an endotoxin in alubumin was conducted by passing bovine serum alubumin of pI 4.8 (manufactured by Seikagaku Kogyo Co., Ltd.) into an acetate buffer at pH 4.3 by 5 mg/ml as a test solution (the concentration of endotoxin is as shown in Table 2) through a column prepared by the same method as in Example 1. The concentration of the endotoxin in the effluent is shown in Table 2.

When the recovery rate of alubumin was examined based on UV-ray absorption (at a wavelength of 280 nm), more than 95% of alubumin was recovered in any of the cases.

Comparative Example 2

A test for removing endotoxin in alubumin was conducted by passing the test solution prepared in the same procedures as in Example 3 (the concentration of endotoxin is as shown in Table 2) under the conditions as shown in Table 2 through a column prepared by the same method as in Comparative Example 1. The endotoxin concentration in the effluent as shown in Table 2. More than 95% of alubumin was recovered.

Comparative Example 3

A test for removing an endotoxin in alubumin was conducted by passing a test solution prepared in the same procedures as in Example 3 (the concentration of endotoxin is as shown in Table 2) under the same conditions shown in Table 2 into a column packed with DEAE Sepharose CL-6B (manufactured by Pharmacia). The concentration of the endotoxin in the effluent is shown in Table 2. More than 95% of alubumin was recovered.

TABLE 2

| Example | No. | Adsorbent | Endotoxin conc. in fed solution (ng/ml) | Endotoxin conc. in effluent (ng/ml) | Condition | | | |
|---|---|---|---|---|---|---|---|---|
| | | | | | pH (—) | Ionic strength (—) | Flow rate (BV·hr$^{-1}$) | Feed volume (ml) |
| Example 2 | 7 | Product of the invention | 260 | 0.02 | 4.3 | 0.01 | 1 | 30 |
| | 8 | | 370 | 0.04 | 4.3 | 0.02 | 1 | 32 |
| | 9 | | 410 | 0.07 | 4.3 | 0.1 | 1 | 32 |
| Comp. Example 2 | 10 | Adsorbent of Japanese Patent Application 63-54285 | 430 | 0.5 | 4.3 | 0.01 | 0.5 | 40 |
| Comp. Example 3 | 11 | DEAE Sepharose CL-6B | 260 | 1.5 | 4.3 | 0.01 | 1 | 50 |
| | 12 | | 240 | 2.2 | 4.3 | 0.02 | 1 | 25 |
| | 13 | | 240 | 6.5 | 4.3 | 0.1 | 1 | 22 |

Examples 4, 5, Comparative Example 4

Absorption isotherm for endotoxin was determined by using the endotoxin adsorbent of the present invention (Example 4), a porous granular chitosan prepared by the method as described in Japanese Patent Publication Sho 63-54285 (Example 5) and DEAE Sepharose CL-6B (Comparative Example 4) and using an acetate buffer at pH 5.2 and an ionic strength of 0.04 for each of the cases.

The relationship between the adsorption amount (ng-endotoxin/g-adsorbent) and the equilibrium concentration (ng-endotoxin/ml) at 3° C. is shown in FIG. 1.

As a result, it is apparent that the endotoxin adsorbent according to the present invention has more excellent performance for removing endotoxin as compared with other adsorbents.

Example 6

A solution prepared by dissolving 70 g of chitosan with a deacetylation degree of 90 mol% and an average molecular weight of 50,000 into 930 g of water containing 70 g of acetic acid was dropped under stirring into an aqueous 10 wt% solution of sodium hydroxide. Subsequently, the precipitates were washed thoroughly to obtain porous chitosan with an average grain size of 0.1 mm. Then, after removing the water content, the porous chitosan was added to acetone and crosslinked with hexamethylene diisocyanate.

The following test was conducted by using the thus obtained crosslinking porous granular chitosan. Upon use, the crosslinked porous granular chitosan was put to alkali washing with an aqueous 0.5N NaOH solution and, subsequently, washed with endotoxin free water.

A liquid sample containing 5 mg/ml of bovine serum alubumin as same as used in Example 3 and endotoxin in an amount shown in Table 3 was passed through a column of 10 mm inner diameter and 100 mm length packed with the crosslinked porous granular chitosan obtained as above. The liquid passing conditions are as shown in Table 3. The concentration of endotoxin in the effluent is shown in Table 3. In each of the tests, the results of determining the recovery rate of alubumin based on UV-ray absorption (280 nm wavelength) was more than 95% in any of the cases.

After each of the tests, the crosslinked porous granular chitosan in the column was regenerated by being brought into contact with 0.5N NaOH for 3 hrs, subjected to water washing. Then, when the same treatment was repeated, substantially the same result of treatment was obtained in any of the cases.

TABLE 3

| No. | Endotoxin conc. in fed solution (ng/ml) | Endotoxin conc. in effluent (ng/ml) | Liquid passing condition ||||
|---|---|---|---|---|---|---|
| | | | pH (—) | Ionic strength (—) | Flow rate (BV·hr$^{-1}$) | Feed volume (ml) |
| 14 | 430 | 8.5 | 4.1 | 0.01 | 2 | 50 |
| 15 | 430 | 5.7 | 4.1 | 0.01 | 1 | 40 |
| 16 | 430 | 0.5 | 4.1 | 0.01 | 0.5 | 40 |
| 17 | 390 | 6 | 4.1 | 0.01 | 0.2 | 35 |
| 18 | 570 | 22 | 4.1 | 0.01 | 0.1 | 30 |

What is claimed is:

1. A method of removing endotoxin from a solution containing endotoxin and other materials, endotoxin being the only material int he solution absorbable onto a crosslinked granular chitosan, comprising, adjusting the pH value of the solution to pH 9 or lower, and passing the solution containing endotoxin through a column packed with the crosslinked granular chitosan, said crosslinked granular chitosan being prepared by crosslinking chitosan by a crosslinking reagent of 0.2–0.8 equivalent amount based on one equivalent amount of amino groups in chitosan.

2. A method as defined in claim 1, wherein the crosslinked granular chitosan is obtained by dispersing an aqueous acidic solution of chitosan into a hydrophobic dispersant and evaporating water under stirring and by crosslinking porous granular chitosan with a crosslinking regent.

3. A method as defined in claim 1 wherein the crosslinked granular chitosan is obtained by granulating a low molecular weight chitosan and then by crosslinking.

4. A method as defined in claim 3, wherein the low molecular weight chitosan has an molecular weight of 10,000 to 500,000 prepared by deacetylating chitin with a deacetylating degree of from 50 to 100 mol%.

5. A method of removing endotoxin from a solution containing protein and endotoxin, comprising, adjusting the pH value of the solution equal to or lower than the isoelectric point of said protein, and passing the solution containing protein and endotoxin through a column packed with a crosslinked granular chitosan, said crosslinked granular chitosan being prepared by crosslinking chitosan by a crosslinking reagent of 0.2–0.8 equivalent amount based on one equivalent amount of amino groups in chitosan.

6. A method as defined in claim 5, wherein the pH value is lower by 0.5 or more as compared with the isoelectric point of the protein.

7. A method as defined in claim 5, wherein the crosslinked granular chitosan is obtained by dispersing an aqueous acidic solution of chitosan into a hydrophobic dispersant and evaporating water under stirring and by crosslinking porous granular chitosan with a crosslinking regent.

8. A method as defined in claim 5, wherein the crosslinked granular chitosan is obtained by granulating a low molecular weight chitosan and then by crosslinking.

9. A method of removing endotoxin from a solution containing endotoxin and other materials, endotoxin being the only material in the solution absorbable onto a crosslinked granular chitosan, comprising, dispersing an aqueous acidic solution of chitosan into a hydrophobic dispersant, said solution including water, evaporating water while stirring with a stirring blade under a condition of rotation of 300–5,000 r.p.m. and a peripheral velocity of 1–20 m/sec to form a porous granular chitosan, crosslinking the porous granular chitosan by a crosslinking reagent of 0.2-0.8 equivalent amount based on one equivalent amount of amino groups in the porous granular chitosan to thereby form the crosslinked granular chitosan, adjusting the pH value of the solution to pH 9 or lower, and passing the solution containing endotoxin through a column packed with the crosslinked granular chitosan so that endotoxin contained in the solution is removed from the solution at a level of pg/ml.

10. A method of removing endotoxin from a solution containing protein and endotoxin, comprising, dispersing an aqueous acidic solution of chitosan into a hydrophobic dispersant, said solution including water, evaporating water while stirring with a stirring blade under a condition of rotation of 300-5,000 r.p.m. and a peripheral velocity of 1-20 m/sec to form a porous granular chitosan, crosslinking the porous granular chitosan by a crosslinking reagent of 0.2-0.8 equivalent amount based on one equivalent amount of amino groups in the porous granular chitosan to thereby form the crosslinked granular chitosan, adjusting the pH value of the solution equal to or lower than the isoelectric point of said protein, and passing the solution containing protein and endotoxin through a column packed with the crosslinked granular chitosan so that endotoxin contained in the solution is removed from the solution at a level of pg/ml.

* * * * *